Patented June 6, 1944

2,350,894

UNITED STATES PATENT OFFICE 2,350,894

PROCESS OF MAKING ALCOHOL MODIFIED UREA-FORMALDEHYDE RESINS

Herbert Hönel, Vienna, Germany; vested in the Alien Property Custodian

No Drawing. Application January 3, 1941, Serial No. 373,053. In Germany December 9, 1939

13 Claims. (Cl. 260—70)

This invention relates to the production of resinous condensation products from urea, formaldehyde and alcoholic compounds.

One object of my invention consists in producing modified urea resins in a more simple and economical way than heretofore known. Another object consists in producing modified urea resins which are novel per se. Further objects will appear hereinafter.

It is known that the condensation of urea with formaldehyde may be carried out in the presence of alcoholic solvents and in absence of water. The resin or resin solution obtained is particularly suited as a base for varnishes. Instead of urea and formaldehyde also dimethylolurea may be employed. The alcoholic compounds more or less take part in the reaction which is considered as an etherification with a part of the methylol groups. It is however inconvenient to use gaseous formaldehyde, and on the other hand anhydrous polymers of formaldehyde as well as the isolation of dimethylolurea are expensive. Consequently it has already been proposed to avoid the isolation of dimethylolurea and only for a short time to react 1 mol of urea with about 2 mols of aqueous formaldehyde in the presence of an alkaline catalyst and a suitable alcoholic substance such as butanol and then to subject the reaction mixture to distillation. The distillate forms two layers, and the layer rich in butanol is continuously reintroduced into the reaction mixture, this procedure being continued, later on in the presence of acid catalysts, until the whole water is removed.

In all these processes only alcoholic solvents may be used which are compatible with water either already in the cold or at least at boiling temperature; such as is the case with the lowest members of alcohols including butyl alcohol or partial ethers or esters of ethylene glycol e. g. "Cellosolve." Butyl alcohol has an exceptional position because it is soluble in the reaction mixture in the heat and to a great part separates from the distillate in the cold. The portion remaining in the watery layer of the distillate, however, may only be recovered by troublesome and circumstantial fractionation. Still higher alcohols which practically would completely separate from the water in the distillate, fail in this process because they can not be combined with the reaction products from urea and formaldehyde mentioned above.

I have now found that syrupy condensation products practically completely free from water may be obtained in a simple way from aqueous formaldehyde and urea, which products extraordinarily readily can directly be combined with alcoholic substances even such as are practically immiscible with water and fail in the processes described hereinbefore. These obviously very low molecular resinous condensation products which are readily soluble both in water and alcohol, are formed if 1 mol of urea is reacted with a quantity of formaldehyde considerably exceeding 2 mols, i. e. with about 2½–4 mols or more, in an alkaline, neutral or only slightly acidic medium during several hours at temperatures between 60 and 100° C. The range of hydrogen ion concentration suitable for the reaction corresponds to a pH of about 5.0–10.0. When subjecting the reaction mixture to distillation, suitably under diminished pressure at temperatures not exceeding 100° C., it will be found surprisingly that almost all the formaldehyde employed has entered the reaction (about 90% or even 97%). Only if a considerable excess over four mols of formaldehyde had been employed the excess will appear in the distillate. The yield of the viscous, clear residue, after carefully being treated in vacuo, nearly exactly corresponds to the sum of the weights of the urea and of the formaldehyde ($CH_2O$) which did not distill off. From these facts I conclude that the condensation products obtained according to my process consist of trimethylolurea and tetramethylolurea respectively or occasionally of mixtures thereof with dimethylolurea, depending upon the proportions used and length of condensation etc.

Particularly when 3 or more mols of formaldehyde have been bound in my process, the condensation products obtained are readily chemically combined with long chain alcohols such as butyl alcohol or even higher ones, probably due to their solubility characteristics, as they are readily soluble in the lower alcohols to any proportion.

A process is known in which formaldehyde is used in excessive proportion corresponding to even almost 4½ molecules per each molecule of urea. In this process, however, the condensation is strongly influenced by the considerable acidity of aqueous formaldehyde which generally shows a pH of 3–4 due to presence of formic acid. This acidity transforms the condensation product primarily formed to relatively high molecular stages and, when driving off the water, gelatinisation occurs even when still large proportions of water are present. Products obtained according to this known process fail in the combination with alcohols aimed at in my present process.

When combining the condensation products primarily achieved in my process as described above, with alcohols I generally add a suitable acidic substance in order to bring about a pH of the reaction mixture between about 5 and 6. If only the lowest members of alcohols or ethylene glycol ethers are used as modifying agents many inorganic or organic acids or acidic salts are serviceable, e. g. hydrochloric acid, phosphoric acid, formic acid, tartaric acid. If however higher molecular alcohols are employed in my process, such as amyl alcohol or higher ones which are not miscible with water to any appreciable extent, I prefer the employment of acidic catalysts which are insoluble in water. Examples for this are partial phosphoric, phthalic, oxalic, tartaric esters, particularly of long chain alkyls with four or more carbon atoms. The employment of water soluble acids etc. can be troublesome in cases where water separates from the reaction mixture to such an extent that a second (aqueous) phase is formed; this frequently takes place when large proportions of long chain alcohols are employed. The modification mainly with long chain alcohols is facilitated by adding small proportions of medium sized alcohols which partly are soluble in water, such as butyl alcohol, at the beginning of the second step of my process, proportions ranging from about ¼–¾ part on each part of the condensation product being suitable.

In my process I prefer the use of alcoholic substances carrying primary alcoholic groups. The proportion of the alcoholic compound may be varied to a great extent, mostly depending upon the degree of modification aimed at. In some cases relatively small proportions suffice, such as about equal parts by weight of alcohol and condensation product primarily formed, and solutions are obtained which may directly serve as varnish bases. In other cases I even employ ten and more parts of the alcohol per one part of urea.

Generally I prefer to eliminate the water which is present at the beginning of the second step of the process and that formed in the course of the latter, by simple distillation. This elimination is also necessary if a far reaching modification (etherification) is aimed at.

I have further found that part of the formaldehyde which has entered the condensation product obtained during the first step of my process, is relatively loosely bound and may be reacted with urea which I add during the second step, i. e. in the alcoholic, slightly acidic medium. The total molecular proportion, however, must not exceed ½ molecule of urea per each molecule of formaldehyde for otherwise precipitates in the reaction mixture or at least turbidity may be formed.

The properties of the end products obtained according to my process may be varied to a large extent, depending upon the conditions employed. Viscous or solid resins generally are obtained if relatively small proportions of alcoholic compounds are employed. These products, as a rule, are thermosetting: they may be employed together with alkyd resins for stove drying or also for self-hardening varnishes. The films obtained are distinguished by excellent resistancy also against water. By prolonged treatment with large proportions of the alcoholic compounds viscous or sticky end products can be obtained which are entirely stable in the heat, and when long chain alcoholic compounds, e. g. having 6 and more C atoms, are employed, also in the presence of strong acids, which fact distinguishes these products over the urea formaldehyde resins heretofore known. In order to obtain products of this type I prefer a total molecular ratio of about 3 or more molecules of formaldehyde bound per each molecule of urea. Resins obtained in this way are compatible in any proportion not only with cellulose esters and cellulose ethers, but also with fatty oils, stand oils, acrylic acid esters, vinyl resins, styrene resins, chlorinated rubber so that they may serve as plasticizing agents in varnishes of nearly any kind or in plastic masses.

Although I specially referred to ordinary alcohols hereinbefore I wish to be understood that compounds carrying other groups besides the alcoholic hydroxy group, such as partially etherified or esterified polyhydric alcohols, chlorinated alcohols, olefinic alcohols may also be employed.

My invention may be better illustrated by the following examples although the invention is not limited thereto.

*Example 1*

60 grams of urea, 240 grams of formaldehyde and 1.2 grams of KOH are heated to 60° C. and, in the course of two hours, the temperature is raised to 80° C. and kept for about another hour. Thereupon the solution is carefully neutralized by addition of phosphoric acid and is subjected to distillation at diminished pressure at a temperature between 60 and 80° C. About 144 grams of a clear or only slightly turbid, sirupy resin almost free from water are obtained. The distillate contains 3.6 grams of formaldehyde, 175 grams of ethyl alcohol, propyl alcohol or butyl alcohol and such an additional quantity of phosphoric acid is added as to secure a pH of 5 to 5.5. The whole mixture is heated under reflux until, except a small quantity of salts formed, it appears perfectly clear which is the case already after a short time. Thereupon 15 to 20 grams of urea are added and heating is continued under reflux or in a closed apparatus for several hours until the solution of the resin formed yields a quickly setting film. The product obtained may serve as a varnish. The properties of the varnish may be varied by adding e. g. a castor oil modified alkyd resin; such a varnish is well suited as a base for stove drying enamels.

*Example 2*

The solution of 100 parts of urea in 500 parts of aqueous formaldehyde (40% vol.), after reducing the acidity to a pH of 5.5 by addition of an alkali, is heated for several hours to 80–85° C. When subjected to distillation in vacuo at the same temperature, 268 to 270 parts of a viscous, perfectly clear, colorless resin are obtained. The resin, when heated in thin layer during several hours to 60–70° C., practically does not suffer any loss in weight. It is soluble in any proportion not only in water but also in ethyl alcohol, and, to a restricted proportion, also in butanol.

In the distillate about 11 to 14 parts of formaldehyde can be established which fact proves that the weight of the resin obtained almost exactly corresponds to the total amount of the components which entered into reaction.

By mixing the resin on a kneading machine with 50 parts of urea until complete solution, if necessary with the aid of heat, a product is obtained which, when heated for a prolonged period of time at temperatures of about 100° C., is gradually converted into high molecular stages and finally into the unmeltable condition. Of course heating may be discontinued at any desired still soluble stage.

A resin soluble in hydrocarbons may be obtained in the following way: The condensation product initially formed is heated together with 500 parts of a mixture of higher alcohols e. g. derived from the catalytical interaction of $H_2$ on CO under pressure. A suitable proportion e. g. of formic acid or of a partial alkyl phosphoric ester is added in order to secure a pH between 5.2 and 5.6. After reacting for about one hour at about 100° C., 40 to 50 parts of urea are added, whereupon the temperature is gradually raised and the water formed during the reaction driven off. The alcoholic upper layer of the distillate is reintroduced into the reaction mixture, and this procedure continued until about 35 to 38 parts of water have been collected. When concentrated to a solid content of about 65% the highly viscous resin solution may be diluted by hydrocarbons of any kind without causing turbidity. It may be employed together with alkyd resins for stove drying or also for self-hardening varnishes. The films obtained are distinguished by excellent resistancy also against water.

Example 3

A solution of 60 grams of urea in 450 grams of formaldehyde (30% by weight), after being nearly neutralized by means of barium hydroxide (pH about 6), is heated for several hours until a sample shows that 4 mols of formaldehyde are bound. After concentrating the reaction mixture under diminished pressure 60 grams of butyl alcohol or amyl alcohol and a sufficient quantity of phosphoric acid are added as to completely precipitate the barium as phosphate. Heating is continued on the boiling waterbath until the reaction mixture has become clear. This process may be accelerated by adding a small portion of a partial phosphoric ester or another acidic compound insoluble in water but soluble in alcohols. Then 900 grams of n-octylalcohol and all together 1.5 grams of partial phosphoric esters obtained by the action of $P_2O_5$ on octyl-alcohol in excess, are added in order to bring about a pH of about 5.5. Finally the filtered solution is heated and subjected to distillation for several hours at 140° C. The octyl-alcohol which did not enter the reaction and mainly remains in the reaction mixture during the preceding treatment is finally removed e. g. by distilling under vacuo.

About 400 to 420 grams of a pale yellow, oily condensation product are obtained being readily soluble both in alcohols and in hydrocarbons of any kind. It may serve as a plasticizing agent in varnishes or in plastic masses. Its complete stability on heating or in the presence even of strong mineral acids is particularly noteworthy and distinguishes the product over the urea formaldehyde resins heretofore known.

The n-octylalcohol may be replaced by a branched primary alcohol or a mixture of e. g. hexyl to decyl alcohols such as derive from $CO+H_2$ high pressure synthesis, or which may be obtained by catalytical hydrogenation of high molecular aldehydes of the aldol synthesis.

What I claim is:

1. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat treated with alcoholic substances having alcoholic groups in the molecule.

2. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat treated with alcoholic substances having alcoholic groups in the molecule at a pH of 5–6.

3. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat treated with alcoholic substances having alcoholic groups in the molecule until a resin is obtained which is stable in the heat.

4. A process for producing resinous products from urea, formaldehyde and alcoholic substances having alcoholic groups in the molecule, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat treated with a multiple proportion of substances carrying primary alcoholic groups, and which have at least 6 C atoms in the molecule, until a resin is obtained which is stable in the heat and in the presence of acids.

5. A process for producing resinous products from urea, formaldehyde and alcoholic substances having alcoholic groups in the molecule, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained whereupon the condensation product obtained is heat treated with ¼–¾ of its weight of an alcoholic substance, partly at least being soluble in water, at a pH of 5–6, long chain, mainly water insoluble alcoholic substances being then added.

6. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat treated with alcoholic substances having alcoholic groups in the molecule and fresh urea is added to the slightly acidified reaction mixture up to such a proportion that in the final product the total quantity of urea corresponds to at the most half the molecular proportion of formaldehyde bound.

7. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat-treated with alcoholic substances having alcoholic groups in the molecule, the water still present and formed during this treatment being eliminated by further distillation.

8. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat treated with alcoholic substances having alcoholic groups in the molecule and fresh urea is added to the slightly acidified reaction mixture up to such a proportion that in the final product the total quantity of urea corresponds to at the most half the molecular proportion of formaldehyde bound, the water still present and formed during this treatment being eliminated by further distillation.

9. A process for producing resinous products from urea, formaldehyde and alcoholic substances, consisting in that urea is first heat-reacted with aqueous formaldehyde in a proportion of 1 to more than 2.5 molecules at a pH between 5 and 10 at a temperature between 60° and 100° C. until nearly the whole formaldehyde is bound prior to the addition of the alcoholic substances, and that the reaction mixture is then subjected to vacuum distillation until at least the main part of water is removed and a syrupy condensation product is obtained, whereupon the condensation product is heat-treated with alcoholic substances having alcoholic groups in the molecule at the most partly miscible with water, acidic substances which are immiscible with water and soluble in alcohols, being added in order to slightly acidify the reaction mixture.

10. A process for producing a resinous product from urea formaldehyde and an alcohol, which comprises first heat reacting urea and aqueous formaldehyde in a proportion of 1 mol of urea to at least 2.5 mols of formaldehyde in the absence of any alcohol, and subjecting the reaction mixture to vacuum distillation until a substantially anhydrous resinous condensation product is obtained having a syrupy consistency, and then etherifying the syrupy product by heat-reacting the same with an alcohol at a pH of 5 to 6.

11. A process for producing a resinous product from urea formaldehyde and an alcoholic substance, which process comprises heat reacting urea with aqueous formaldehyde in a proportion of 1 mol of urea to from 2.5 to 4 mols of formaldehyde at a pH between 5 and 10 and at a temperature between 60° and 100° C. until nearly all of the formaldehyde is reacted, prior to addition of the alcoholic substance, then subjecting the reaction mixture to vacuum distillation at a temperature not exceeding 100° C. until a substantially anhydrous low molecular resinous condensation product is formed having a syrupy consistency, and then heat-reacting the said syrupy condensation product with the alcoholic substance at a pH of 5 to 6.

12. A process as set forth in claim 10 wherein the alcoholic substance is a long chain water insoluble alcohol.

13. A process as set forth in claim 10 wherein the alcoholic substance is a mixture of water soluble and water insoluble alcohols.

HERBERT HÖNEL.